United States Patent
Tsuyunashi et al.

(10) Patent No.: US 9,815,478 B2
(45) Date of Patent: Nov. 14, 2017

(54) DRIVING ASSISTANCE SYSTEM AND DRIVING ASSISTANCE METHOD

(71) Applicant: FUJITSU TEN LIMITED, Kobe-shi, Hyogo (JP)

(72) Inventors: Masashi Tsuyunashi, Kobe (JP); Toshitaka Yamato, Kobe (JP); Shogo Tanaka, Kobe (JP); Yoshikazu Hashimoto, Kobe (JP); Takashi Ohta, Kobe (JP)

(73) Assignee: FUJITSU TEN LIMITED, Kobe (JP)

( * ) Notice: Subject to any disclaimer, the term of this patent is extended or adjusted under 35 U.S.C. 154(b) by 73 days.

(21) Appl. No.: 14/935,042

(22) Filed: Nov. 6, 2015

(65) Prior Publication Data
US 2016/0159366 A1   Jun. 9, 2016

(30) Foreign Application Priority Data
Dec. 8, 2014   (JP) ................... 2014-248270

(51) Int. Cl.
| | | |
|---|---|---|
| *B60W 40/09* | (2012.01) | |
| *G08G 1/16* | (2006.01) | |
| *G08G 1/01* | (2006.01) | |
| *B60W 50/14* | (2012.01) | |
| *B60W 50/00* | (2006.01) | |

(52) U.S. Cl.
CPC ............ *B60W 40/09* (2013.01); *B60W 50/14* (2013.01); *G08G 1/0129* (2013.01); *G08G 1/16* (2013.01); *B60W 2050/0089* (2013.01); *B60W 2540/30* (2013.01); *B60W 2550/20* (2013.01); *B60W 2550/402* (2013.01)

(58) Field of Classification Search
CPC ........ G08G 1/11; G08G 1/0129; B60W 40/09
See application file for complete search history.

(56) References Cited

U.S. PATENT DOCUMENTS

| | | | | |
|---|---|---|---|---|
| 7,679,499 | B2* | 3/2010 | Yamada ............... | G01C 21/26 340/439 |
| 2004/0193347 | A1* | 9/2004 | Harumoto .......... | B60R 21/0132 701/45 |
| 2011/0029184 | A1* | 2/2011 | Brighenti .......... | B60W 30/0953 701/31.4 |
| 2012/0068858 | A1* | 3/2012 | Fredkin ............ | G08G 1/096741 340/902 |

(Continued)

FOREIGN PATENT DOCUMENTS

| | | |
|---|---|---|
| JP | 2004171060 A | 6/2004 |
| JP | 2006343904 A | 12/2006 |

(Continued)

*Primary Examiner* — Andrew Bee
(74) *Attorney, Agent, or Firm* — Oliff PLC

(57) ABSTRACT

A driving assistance system includes a history storage unit, a behavior detecting unit, a state determining unit, and a notifying unit. The history storage unit stores a behavior history which is a past behavior history of a driver. The behavior detecting unit detects a current behavior of the driver. The state determining unit determines an unsafe state by comparing the transition of the behavior detected by the behavior detecting unit with the behavior history of the driver corresponding to a current driving path. If the state determining unit determines the unsafe state, the notifying unit gives notification to the driver.

5 Claims, 5 Drawing Sheets

(56) References Cited

U.S. PATENT DOCUMENTS

| 2013/0088369 A1* | 4/2013 | Yu ........................ B60W 40/09 |
| | | 340/905 |
| 2014/0276090 A1* | 9/2014 | Breed ..................... A61B 5/18 |
| | | 600/473 |
| 2015/0191083 A1* | 7/2015 | Boss ...................... B60K 28/06 |
| | | 701/1 |
| 2015/0228194 A1* | 8/2015 | Nomura ............. G01C 21/3647 |
| | | 348/118 |

FOREIGN PATENT DOCUMENTS

| JP | 2010088249 A | 4/2010 |
| JP | 2012118951 A | 6/2012 |
| JP | 2013065246 A | 4/2013 |

\* cited by examiner

DRIVING ASSISTANCE SYSTEM AND DRIVING ASSISTANCE METHOD

CROSS-REFERENCE TO RELATED APPLICATIONS

This application is based on and claims priority under 35 USC 119 from Japanese Patent Application No. 2014-248270 filed on Dec. 8, 2014, the entire content of which is incorporated herein by reference.

BACKGROUND

1. Technical Field

The present invention relates to a driving assistance system and a driving assistance method.

2. Related Art

In the related art, there is known a driving assistance system for detecting unsafe states such as drowsy driving and distracted driving and warning drivers. For example, in JP-A-2013-65246, there is disclosed a driving assistance system for measuring a level (a degree) of inappropriate driving and issuing a warning if the level of inappropriate driving reaches a warning level.

SUMMARY OF INVENTION

As for the above described driving assistance system, it is desirable to more accurately detect unsafe states with respect to drivers and notify the drivers of the unsafe states.

In view of the above, an illustrative aspect of the present invention is to provide a driving assistance system and a driving assistance method capable of more accurately detecting unsafe states with respect to drivers and notifying the drivers of the unsafe states.

An aspect of the present invention provides a driving assistance system including: a history storage unit that stores a behavior history which is a past behavior history of a driver; a behavior detecting unit that detects a current behavior of the driver; a state determining unit that determines an unsafe state by comparing a transition of the current behavior detected by the behavior detecting unit with the behavior history of the driver corresponding to a current driving path; and a notifying unit that gives notification to the driver when the state determining unit determines the unsafe state.

The aspect of the present invention discussed above is able to more accurately detect unsafe states with respect to drivers and notify the drivers of the unsafe states.

DESCRIPTION OF EMBODIMENTS

Hereinafter, an embodiment of a driving assistance method according to the present invention will be described in detail on the basis of the accompanying drawings. However, this embodiment does not limit the present invention.

Figure 1:
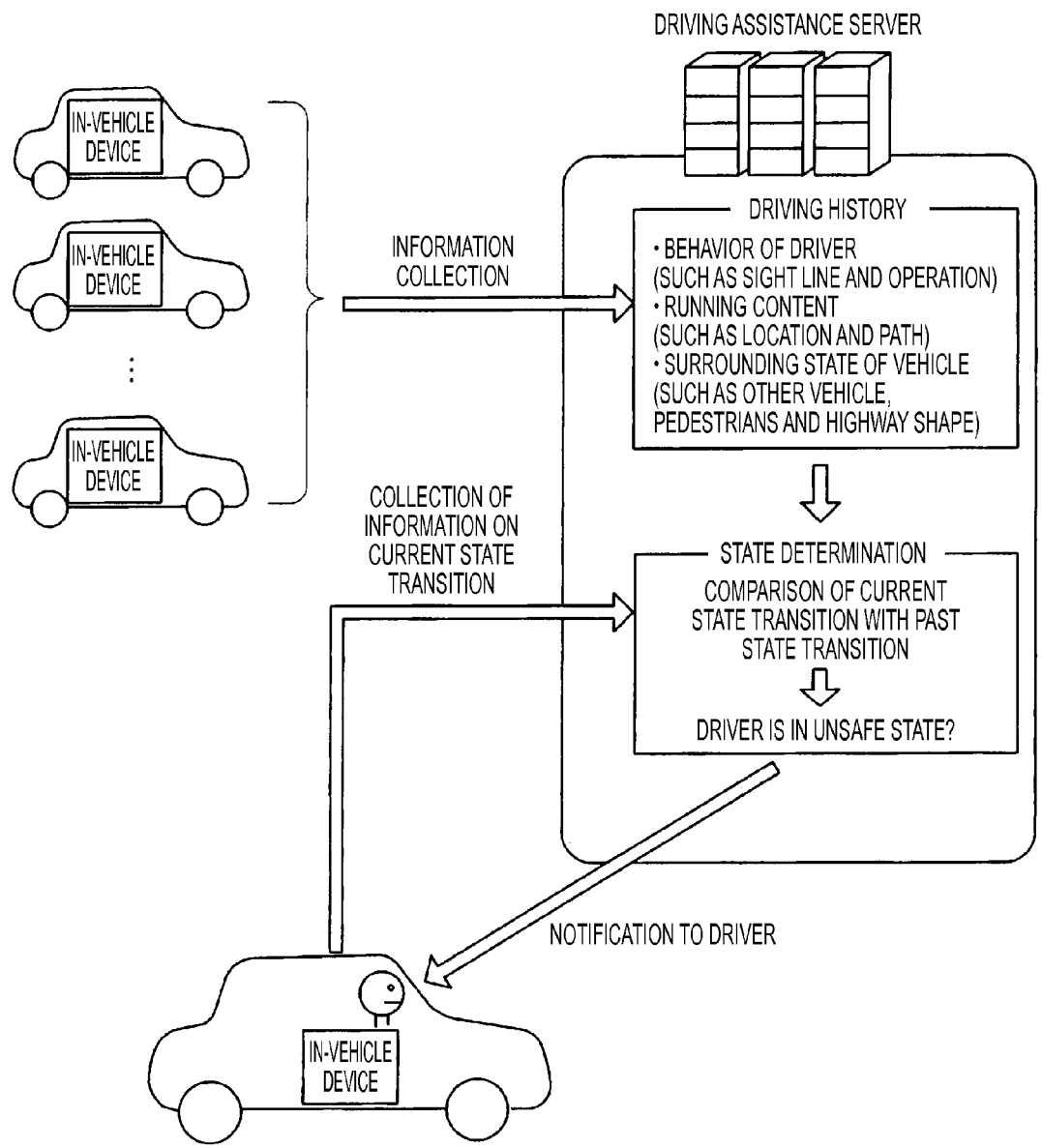
FIG. 1 is an explanatory view of a driving assistance method according to an embodiment of the present invention.

FIG. 1 is an explanatory view of a driving assistance method according to the embodiment of the present invention. The driving assistance method is performed by a driving assistance system including in-vehicle devices and a driving assistance server. As shown in FIG. 1, in the driving assistance system according to the embodiment, the driving assistance server collects information items from the in-vehicle devices mounted on individual vehicles, and stores the collected information items as histories of corresponding drivers (hereinafter, referred to as driving histories).

Examples of information items which the driving assistance server collects from the in-vehicle devices include behaviors of the drivers and the running locations and surrounding states of the vehicles. The behaviors of the drivers include sight line states, face movements, sound production, brake operations, accelerator operations, steering wheel operations, winker operations, and the like of the drivers. Examples of the running locations include the longitudes and latitudes of the vehicles, etc. Also, examples of the surrounding state of each vehicle include the number and locations of other vehicles around the corresponding vehicle, the number and locations of pedestrians around a highway where the corresponding vehicle runs, the shape of a highway where the corresponding vehicle runs, the sizes and locations of buildings around a roadway where the corresponding vehicle runs, and so on.

The driving assistance server can model a past behavior transition of each driver in association with the driving path and surrounding state of a corresponding vehicle, for example, by performing statistical processing or the like on the basis of the driving histories collected for the individual drivers. Also, the driving assistance server can model a past behavior transition common to a plurality of drivers, in association with the driving paths and surrounding states of corresponding vehicles.

The driving assistance server continuously collects information items from the individual vehicles. On the basis of the continuously collected information items, the driving assistance server determines the driving path of each vehicle, and determines an unsafe state of each driver by comparing a current behavior transition model with a past behavior transition corresponding to the current driving path and surrounding state of a corresponding vehicle. The surrounding state of the vehicle is considered because behavior of the driver varies in response to the surrounding state of the vehicle. However, the surrounding state of the vehicle may not be considered.

Further, the driving assistance server can store the driving path of the vehicle subjected to the determination, as a driving history. Also, in a case where a highway between neighboring intersections is considered as one section, a driving path may be one section or may be a plurality of continuous sections.

If the driving assistance server determines that a driver is in an unsafe state, it issues a notification representing that the driver is in the unsafe state, to an in-vehicle device mounted on the vehicle of the driver. If the corresponding in-vehicle device receives the notification, it notifies the driver of the unsafe state.

As described above, the driving assistance server collects big data on the behaviors of the drivers and the surrounding states of the vehicles, and determines an unsafe state of each driver by comparing a current behavior transition with a past behavior transition corresponding to the current driving path and surrounding state of a corresponding vehicle. As a result, it is possible to more accurately detect an unsafe state of each driver and notify the corresponding driver of the unsafe state, thereby capable of appropriately inducing the driver to drive safely.

Figure 2:
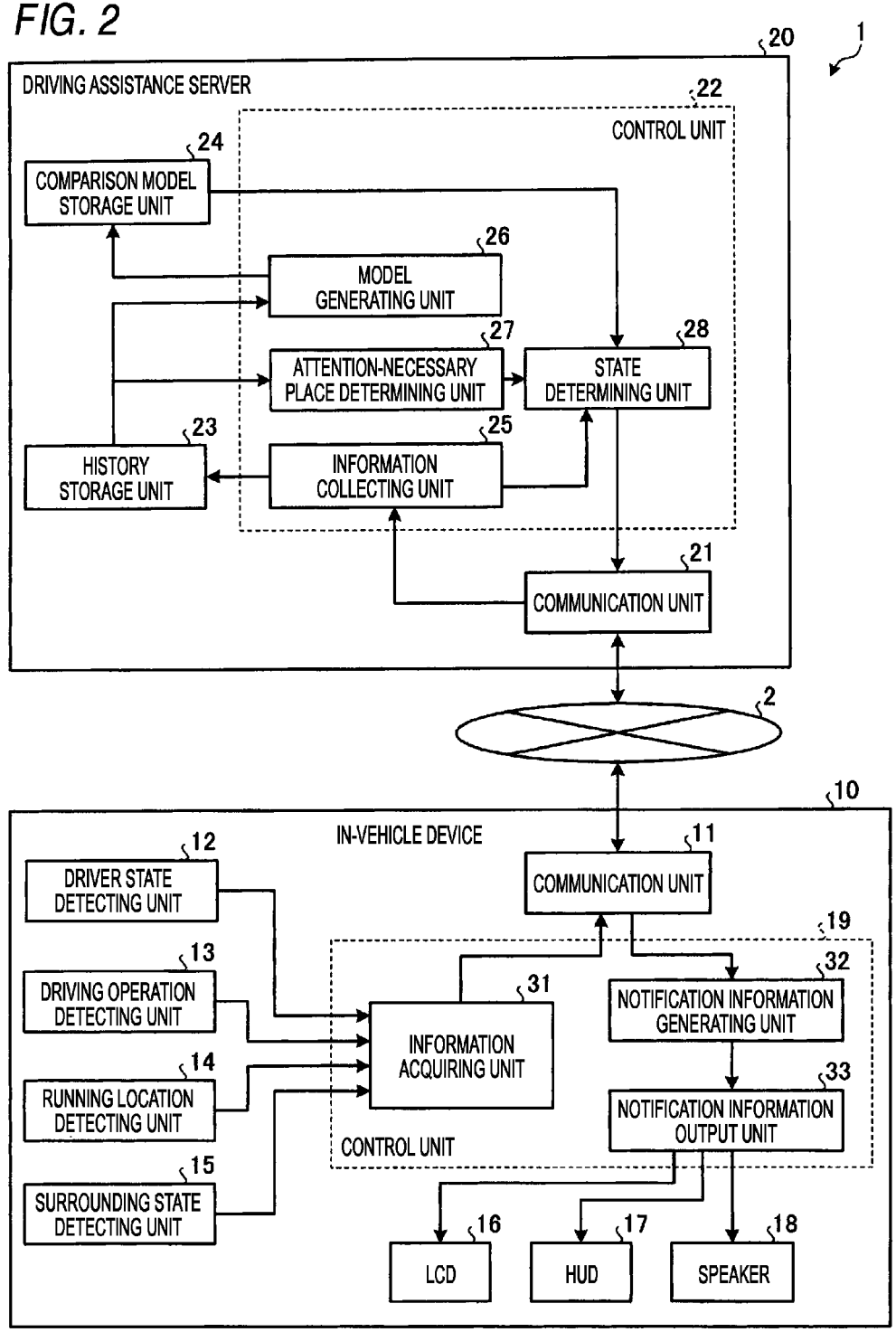
FIG. 2 is a view illustrating an example of the configuration of a driving assistance system according to the embodiment of the present invention.

Hereinafter, the driving assistance system and the driving assistance method according to the embodiment of the present invention will be described in more detail. FIG. 2 is a view illustrating an example of the configuration of the driving assistance system according to the embodiment of the present invention.

As shown in FIG. 2, a driving assistance system 1 according to the embodiment includes an in-vehicle device 10 and a driving assistance server 20. Although the example shown in FIG. 2 includes one in-vehicle device 10, the driving assistance system 1 includes a plurality of in-vehicle devices 10 as shown in FIG. 1.

Each in-vehicle device 10 includes a communication unit 11, and is connected to the driving assistance server 20 through a communication network 2. The communication network 2 is, for example, a wireless public communication network; however, it may be a dedicated wireless network. The in-vehicle device 10 includes a driver state detecting unit 12, a driving operation detecting unit 13, a running location detecting unit 14, a surrounding state detecting unit 15, a liquid crystal display (LCD) 16, a head-up display (HUD) 17, a speaker 18, and a control unit 19. Respective units in the in-vehicle device 10 are realized by a hardware such as a processor, a memory and a network interface (NIC).

The driver state detecting unit 12 detects driver's states such as sight line movements, face movements, body movements, and sound production. For example, the driver state detecting unit 12 includes a camera for acquiring images of a driver, and detects the positions of the eyes of the driver from driver images acquired by the camera, and detects sight line movements from the positions of the eyes.

Also, for example, the driver state detecting unit 12 can detect face movements and body movements from images of the driver, and can acquire driver's voice through a microphone (not shown) and analyze the voice.

The driving operation detecting unit 13 detects the state of a driver's driving operation such as a brake operation, an accelerator operation, a steering wheel operation, a winker operation, a wiper operation, or a headlight operation. The driver state detecting unit 12 and the driving operation detecting unit 13 are examples of a behavior detecting unit which detects driver's behaviors.

The running location detecting unit 14 detects the running location (longitude and latitude) of the vehicle, for example, by a GPS or the like. Also, the running location detecting unit 14 can detect the location of a roadway where the vehicle runs, instead of longitude and latitude, as the running location.

Also, the running location detecting unit 14 can detect a driving path of the vehicle as the running location. For example, a driving path of the vehicle is determined according to a driver's operation or the like by a navigation device (not shown) of the in-vehicle device 10, and the running location detecting unit 14 can acquire the driving path of the vehicle from the navigation device.

The surrounding state detecting unit 15 detects the surrounding state of the vehicle such as the number and locations of other vehicles and pedestrians, the sizes and locations of buildings and the shape of a roadway where the vehicle runs. For example, the surrounding state detecting unit 15 includes a plurality of cameras mounted on the vehicle, and analyzes images of the periphery of the vehicle acquired by those cameras, and detects the number and locations of other vehicles and pedestrians around the vehicle, the sizes and locations of buildings, the shape of a roadway where the vehicle runs, and the like.

The control unit 19 includes an information acquiring unit 31, a notification information generating unit 32, and a notification information output unit 33. The information acquiring unit 31 acquires information items detected by the driver state detecting unit 12, the driving operation detecting unit 13, the running location detecting unit 14, and the surrounding state detecting unit 15, and transmits the acquired information items to the driving assistance server 20 through the communication unit 11.

The notification information generating unit 32 generates notification information to be notified to the driver, on the basis of information acquired from the driving assistance server 20, and the notification information output unit 33 outputs the notification information generated by the notification information generating unit 32, from at least one of the LCD 16, the HUD 17, and the speaker 18. Also, the notification information generating unit 32, the notification information output unit 33, the LCD 16, the HUD 17, and the speaker 18 correspond to examples of a notifying unit.

The driving assistance server 20 includes a communication unit 21, a control unit 22, a history storage unit 23, and a comparison model storage unit 24. The communication unit 21 is connected to each in-vehicle device 10 through the communication network 2 such that communication is possible. Respective units in the driving assistance server 20 are realized by a hardware such as a processor, a memory and a network interface (NIC).

The control unit 22 includes an information collecting unit 25, a model generating unit 26, an attention-necessary place determining unit 27, and a state determining unit 28. The information collecting unit 25 collects information from each in-vehicle device 10, and stores the collected information in the history storage unit 23. With respect to each driver, the history storage unit 23 stores, for example, the state of the driver, a driving operation state, the running location of the vehicle, the driving path of the vehicle, and the surrounding state of the vehicle, as a driving history of the driver, in association with one another. With respect to each driver, the history storage unit 23 stores, for example, the state of the driver, a driving operation state, the running location of the vehicle, the driving path of the vehicle, and the surrounding state of the vehicle, as a driving history of the driver, in association with one another, such that statistic processing and outputting are possible. In short, the history storage unit 23 stores a time, a place, driver identification information, a driving path, the surrounding state of a vehicle, a viewpoint state, and the like, in association with one another, such that it is possible to use each item as a key to extract data.

The model generating unit 26 performs statistic processing or the like with respect to each driver, on the basis of the information stored in the history storage unit 23, thereby modeling a behavior transition of the corresponding driver in association with the running location, path, and surrounding state of a corresponding vehicle. Behavior of a driver is, for example, a driver's state or a driving operation state, and a behavior transition of a driver is, for example, a transition of a driver's state or a transition of a driving operation state.

For example, in a case where a driver A has passed a path Y multiple times, the model generating unit 26 performs statistic processing on behavior transitions of the driver A and the surrounding states of the vehicle on the path Y, thereby obtaining a behavior transition estimation model (hereinafter, referred to as a personal behavior estimation model) of the driver A according to the surrounding state of the vehicle on the path Y.

Also, for example, in a case where a plurality of drivers each has passed a path Z multiple times, the model generating unit 26 performs statistic processing on behavior transitions of the drivers and the surrounding states of vehicles, thereby obtaining a behavior transition estimation model (hereinafter, referred to as a common behavior estimation model) common to the drivers according to the surrounding states of the vehicles.

The attention-necessary place determining unit 27 determines an attention-necessary place requiring careful driving, on the basis of driver's behavior histories stored in the history storage unit 23, and stores information on the attention-necessary place in an internal storage unit (corresponding to an example of a place information storage unit). The attention-necessary place determining unit 27 determines places where, for example, a sudden brake operation, a sudden pedal operation, or a sudden accelerator operation is performed, and determines those places as attention-necessary places.

Also, the attention-necessary place determining unit 27 can collect the sight lines, face movements, body movements, sound production, and the like of the drivers, and determine attention-necessary places on the basis of the corresponding information. For example, in general, drivers carefully watch points where children often suddenly rush out. Further, drivers who frequently pass those points and drivers who live around those points often move their sight lines according to children suddenly rushing out. For this reason, the attention-necessary place determining unit 27 collects information on the sight lines of drivers who frequently pass points where children often suddenly rush out and drivers who live around those points, and determines attention-necessary places.

As described above, the attention-necessary place determining unit 27 can estimate dangerous points where children may suddenly rush out (for example, roadways where drivers should carefully drive, and spots for which drivers should watch out (such as alley exits), for example, on the basis of driver path information (for example, people who frequently pass through those points) and sight line information. Also, on the basis of accident information (accidents attributable to children suddenly running out) and sight line information, the attention-necessary place determining unit 27 can estimate, for example, points for which drivers should watch out at accident places (points where children may suddenly rush out). In other words, the attention-necessary place determining unit 27 can estimate places where drivers take generally dangerous behavior such as distracted driving, as attention-necessary places, by statistic processing on sight line information and/or general and statistic data such as maps, and can estimate unusual-danger occurrence places and danger occurrence places associated with detailed locations, as attention-necessary places, by statistic processing on individual and dynamic data such as driver information (such as addresses and path information) and accident information. Also, for example, in a case where it can be seen on the basis of sight line information of drivers that the sight lines of many drivers have moved toward a side, the attention-necessary place determining unit 27 can estimate, for example, a place where distracted driving frequently occurs (such as a place where there is a famous building), as an attention-necessary place, by statistic processing.

With respect to each driver, the state determining unit 28 determines the current driving path of the driver collected by the information collecting unit 25, and compares the current behavior transition of the driver with the past behavior transition of the driver according to the current driving path, the surrounding state of the vehicle, and the like. In a case where similarity between the current behavior of the driver and the past behavior of the driver (hereinafter, referred to as behavior similarity) is high, the state determining unit 28 determines that the driving state of the driver is not unsafe; whereas in a case where the behavior similarity is low, the state determining unit determines that the driving state of the driver is unsafe.

For example, in a case where the difference between the current behavior transition of the driver and the surrounding state of the vehicle and those of the personal behavior estimation model is equal to or greater than a predetermined reference, the state determining unit 28 determines that the driving state of the driver is unsafe. For example, in a case where the movement transition of the sight line or head of the driver is significantly different from that of the personal behavior estimation model, the state determining unit 28 determines that the driving state of the driver is unsafe.

Also, for example, in a case where the transition of at least one driving operation of a brake operation, an accelerator operation, and a winker operation is significantly different from that of the personal behavior estimation model, the state determining unit 28 determines that the driving state of the driver is unsafe.

Also, for example, the state determining unit 28 analyzes the content of a voice instruction of the driver to the navigation device of the in-vehicle device 10, and determines the physical condition of the driver on the basis of the volume and content of the voice. In a case of determining that the physical condition is bad, the state determining unit determines that the driving state of the driver is unsafe.

For example, in a case where the difference between the current behavior transition of the driver and the surrounding state of the vehicle and those of the common behavior estimation model is equal to or greater than a predetermined reference, the state determining unit 28 determines that the driving state of the driver is unsafe. Also, for example, in a case where the difference between the current behavior transition of the driver and the surrounding state of the vehicle and those of the common behavior estimation model of a path for which any personal behavior estimation model has not been generated is equal to or greater than a predetermined reference, the state determining unit 28 can determine that the driving state of the driver is unsafe.

Figure 3:
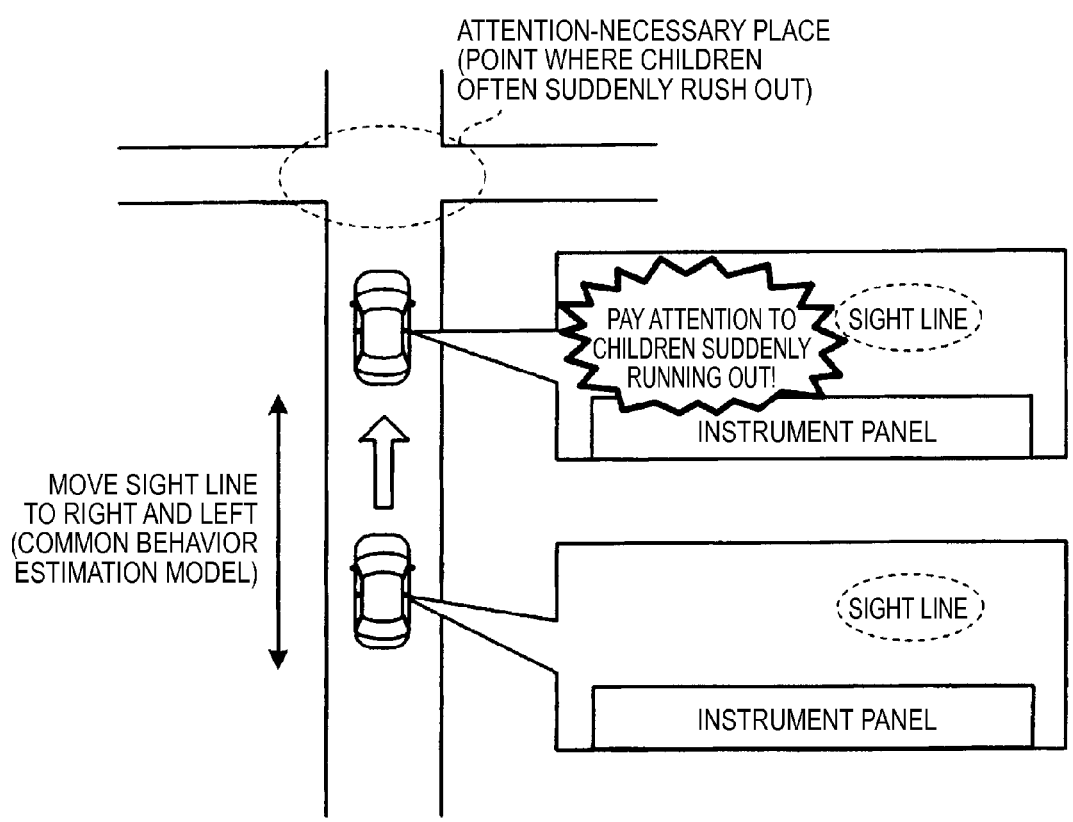
FIG. 3 is a view illustrating an example of an unsafe state determination of a state determining unit.

FIG. 3 is a view illustrating an unsafe state determination example using a common behavior estimation model. As shown in FIG. 3, in a case where drivers who frequently pass through an attention-necessary place where children often suddenly rush out and drivers who live around the corresponding attention-necessary place are close to the corresponding attention-necessary place, in front of the attention-necessary place, the drivers move their sight lines to the right and left of the attention-necessary place.

In this case, for example, the model generating unit 26 can perform statistic processing on the behavior transitions of the drivers who frequently pass the attention-necessary place and the surrounding states of their vehicles, thereby obtaining a common behavior estimation model. On the basis of the obtained common behavior estimation model, if a driver does not move his sight line to the right and left of the attention-necessary place in front of the attention-necessary place, the state determining unit 28 determines that the driving state of that driver is unsafe. Therefore, even in a case where there are attention-necessary places on a path where a driver drives for the first time, it is possible to appropriately determine whether the driving state of the driver is unsafe. Also, although the common behavior estimation model may be obtained on the basis of data on every driver (data on every driver having driven their vehicles the corresponding place, it can be estimated that it is possible to obtain a more appropriate common behavior estimation model on the basis of data on people who are familiar with the state of the corresponding place and can more appropriately drive their vehicles, such as people who frequently drive their vehicle through the corresponding place and people whose life zones are around the corresponding place. Therefore, the model generating unit 26 is configured to be able to generate a common behavior estimation model on the basis of some drivers, instead of every driver.

In a case of determining that the driving state of a driver is unsafe, the state determining unit 28 determines a timing to notify the corresponding information to the driver. For example, in a case of determining that the driving state of a driver is unsafe, the state determining unit 28 determines whether there is any attention-necessary place on the current driving path of the corresponding driver.

If it is determined that there is an attention-necessary place on the current driving path of the driver, the state determining unit 28 determines a distance from the current running location to the attention-necessary place (hereinafter, referred to as the arrival distance) or a required time from the current running location to the attention-necessary place (hereinafter, referred to as the arrival time).

The state determining unit 28 notifies a notification level according to the arrival distance or the arrival time to the in-vehicle device 10 of the vehicle of the unsafe driver through the communication unit 21. The state determining unit 28 notifies a higher notification level as the vehicle gets close to the attention-necessary place.

Figure 4:
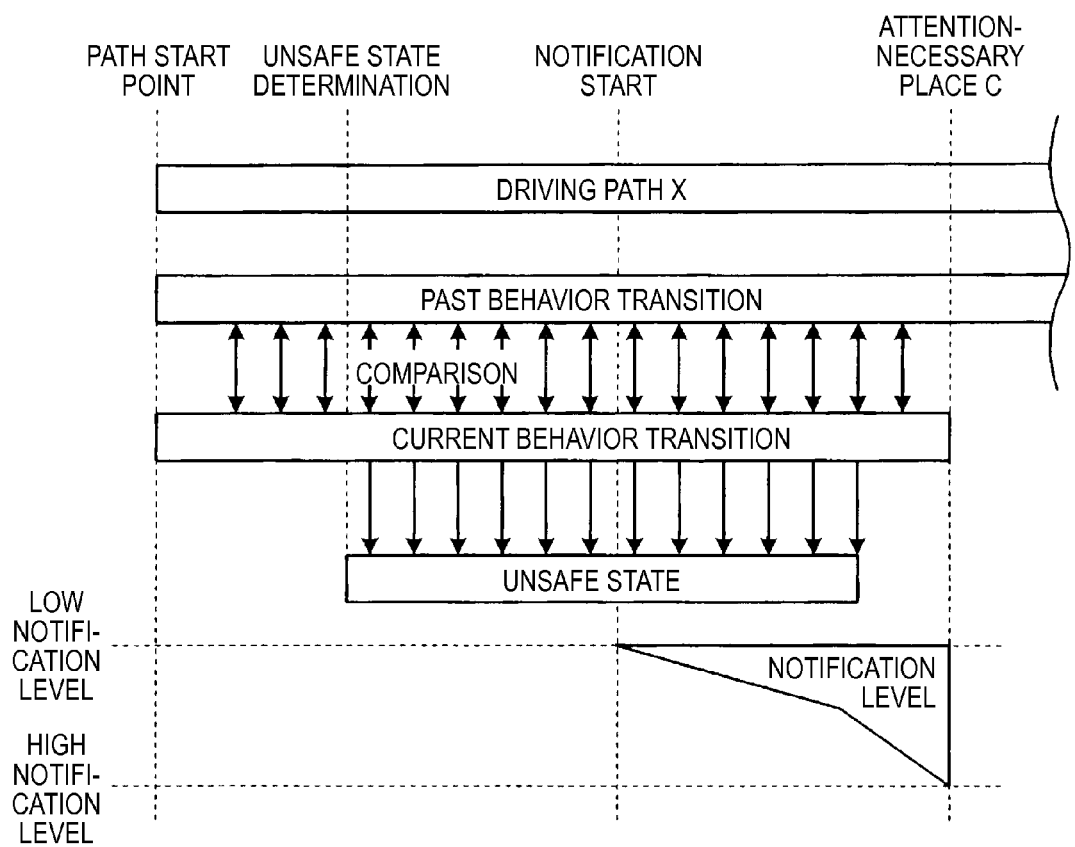
FIG. 4 is an explanatory view of a process of the state determining unit, and shows an example in which the state determining unit notifies a driver of a notification level.

FIG. 4 is an explanatory view of a process of the state determining unit 28, and shows an example in which the state determining unit 28 notifies a notification level to a driver A. As shown in FIG. 4, the state determining unit 28 acquires or determines a path (hereinafter, referred to as the driving path X) where the driver A is driving, on the basis of information collected by the information collecting unit 25.

The state determining unit 28 acquires a personal behavior estimation model corresponding to the driving path X, as the past behavior transition of the driver A, from the comparison model storage unit 24. Also, the state determining unit 28 determines whether the driving of the driver A is unsafe, for example, by comparing the personal behavior estimation model and the current behavior transition of the driver A collected by the information collecting unit 25.

In a case of determining that the driving of the driver A is unsafe, the state determining unit 28 determines whether there is any attention-necessary place on the driving path X. If it is determined that there is an attention-necessary place (hereinafter, referred to as the attention-necessary place C) on the current driving path of the driver A, the state determining unit 28 determines whether a distance from the current location to the attention-necessary place C (the arrival distance) is within a predetermined distance, or whether the required time from the current location to the attention-necessary place C (the arrival time) is within a predetermined time.

In a case where the arrival distance is within the predetermined distance, or the arrival time is within the predetermined time, the state determining unit 28 notifies a notification level according to the arrival distance or the arrival time to the in-vehicle device 10 of the vehicle which the driver A drives. As the arrival distance decreases, or as the arrival time decreases, the state determining unit 28 increases the notification level.

If the notification information generating unit 32 of the in-vehicle device 10 receives information on the notification level from the driving assistance server 20 through the communication unit 11, it generates notification information according to the notification level. For example, the notification information generating unit 32 generates notification information for performing visual notification, acoustic notification, and tactile notification, on the basis of the notification level.

The visual notification is notification representing a warning using characters, images, and the like for calling driver's attention, and the acoustic notification is notification representing a warning using sound for calling driver's attention, and the tactile notification representing a warning using, for example, vibration for calling driver's attention.

As the notification level which is notified from the driving assistance server 20 increases, the notification information generating unit 32 increases the level of the warning for the driver. For example, in a case where there are five notification levels, at the lowest notification level 1, the notification information generating unit 32 generates notification information for performing visual notification, and outputs the notification information from the notification information output unit 33 to the LCD 16.

Also, for example, at the notification level 3, the notification information generating unit 32 generates notification information for performing visual notification, and outputs the notification information from the notification information output unit 33 to the HUD 17. For example, the notification information which is displayed on the HUD 17 includes information representing that the driver should carefully drive, and is displayed in a shape and colors determined in view of an induction effect such that the notification information can effectively stimulate the driver by light.

Also, for example, at the notification level 5, the notification information generating unit 32 generates notification information for performing visual, acoustic, and tactile notification, and outputs the notification information to the HUD 17, the speaker 18, and a vibrator (not shown). Also, for example, the vibrator is disposed on a steering wheel or a seat. Also, the notification information for the speaker 18 is generated, for example, by voice synthesis.

As described above, as the notification level which is notified from the driving assistance server 20 increases, the notification information generating unit 32 generates notification information such that the level of the warning increases. Therefore, until the driver reaches the attention-necessary place, the driving assistance system 1 can effectively make the driver transition from an unsafe state to a safe state, and can make the driver keep his attention, thereby resulting in an easy behavior at the attention-necessary place.

Figure 5:
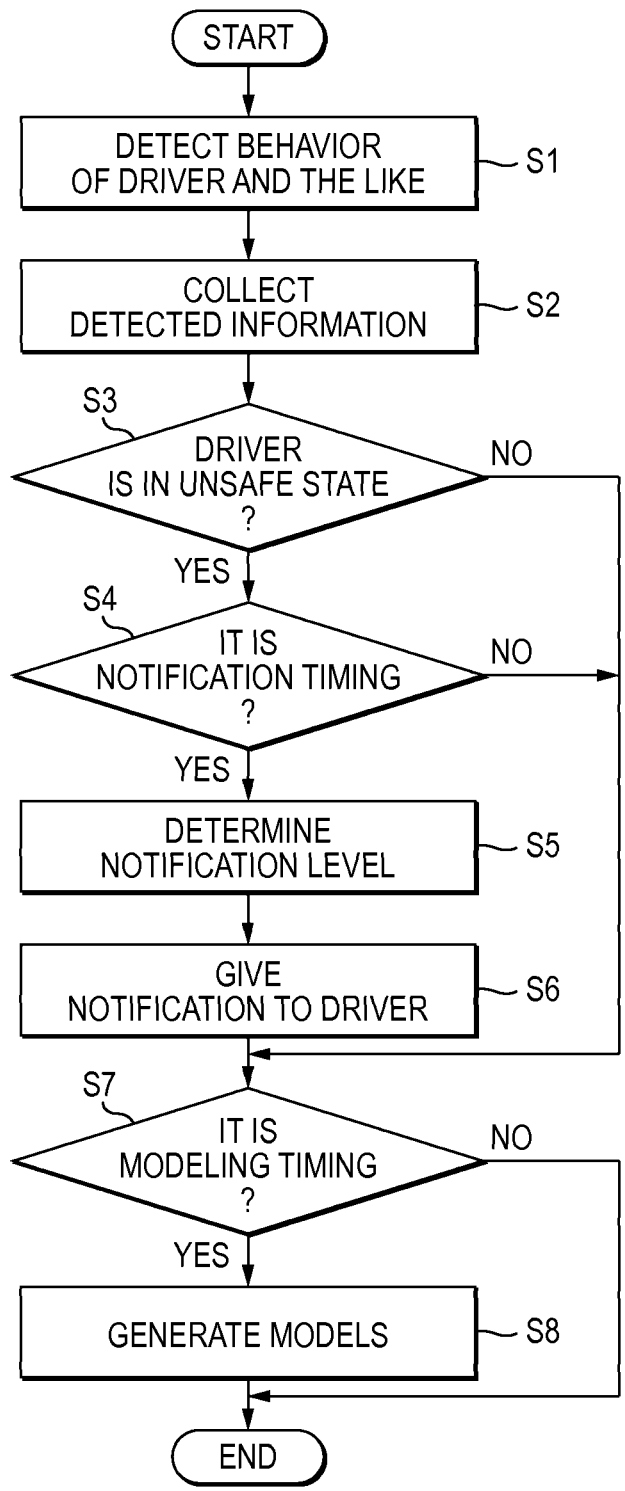
FIG. 5 is a flow chart illustrating the procedure of main processes which the driving assistance system performs.

Subsequently, an example of the flow of processes of the driving assistance system 1 will be described with reference to the flow chart of FIG. 5. FIG. 5 is a flow chart illustrating the procedure of main processes which the driving assistance system 1 repeatedly performs.

As shown in FIG. 5, in STEP 51, each in-vehicle device 10 of the driving assistance system 1 detects the behavior and the like of the driver. Information detected as described above is transmitted from each in-vehicle device 10 to the driving assistance server 20. In STEP S2, the driving assistance server 20 collects the information detected by each in-vehicle device 10.

In STEP S3, on the basis of the information detected by each in-vehicle device 10, the driving assistance server 20 compares the current behavior transition of the driver and a driver behavior history corresponding to the current driving path, thereby determining whether the driving state of the driver is unsafe.

If it is determined that the driving state of the driver is unsafe ("Yes" in STEP S3), in STEP S4, the driving assistance server 20 determines whether it is a notification timing. For example, on the basis of an arrival distance or an arrival time to an attention-necessary place, the driving assistance server 20 determines whether it is the notification timing.

If it is determined that it is the notification timing ("Yes" in STEP S4), in STEP S5, the driving assistance server 20 determines the notification level. In STEP S6, the notification level is transmitted from the driving assistance server 20 to the in-vehicle device 10, and the in-vehicle device 10 gives notification according to the notification level to the driver.

In a case where it is determined that the driving state of the driver is not unsafe ("No" in STEP S3), or in a case where it is determined that it is not the notification timing ("No" in STEP S4), or if the process of STEP S6 finishes, in STEP S7, the driving assistance server 20 determines whether it is a modeling timing.

In a case where it is the modeling timing ("Yes" in STEP S7), in STEP S8, the driving assistance server 20 generates a personal behavior estimation model or a common behavior estimation model. In a case where it is not the modeling timing ("No" in STEP S7), or if the process of STEP S8 finishes, the driving assistance server 20 finishes the series of processes.

Also, the processes of FIG. 5 except the processes of STEPS S2, S7, and S8 can be performed by the in-vehicle device 10. In this case, the driving assistance server 20 notifies information on the models and the like to the in-vehicle device 10, and the in-vehicle device 10 can perform the processes of STEPS S3 to S6 on the basis of the information acquired from the driving assistance server 20.

Also, although it is determined in the above described embodiment whether the driving state of the driver is unsafe, the state determining unit 28 of the driving assistance server 20 can determine one of multiple unsafe levels representing how much the driver is unsafe.

The state determining unit 28 can store a table defining the relation between unsafe levels and notification levels in an internal storage unit, and acquire a notification level corresponding to the determined unsafe level from the storage unit, and notify the notification level to the in-vehicle device 10. As a result, it is possible to more effectively make the driver transition from the unsafe state to a safe state.

Also, in the above described embodiment, if the state determining unit 28 determines that the driving state of the driver is unsafe, it notifies the corresponding information to the driver on the basis of the arrival distance or the arrival time to the attention-necessary place. However, at a timing when the state determining unit 28 recognizes a driving path, if there is an attention-necessary place on the corresponding driving path, the state determining unit may transmit notification information to the in-vehicle device 10.

In this case, for example, at a timing when the driver inputs a path to the navigation device of the in-vehicle device, a warning is given to the driver. Therefore, it is possible to notify the driver that there is the attention-necessary place on the path, in advance.

Also, in the above described embodiment, the model generating unit 26 generates personal behavior estimation models and common behavior estimation models on the basis of usual behavior transitions of drivers by performing statistic processing on the behavior transitions of the drivers and the surrounding states of their vehicles. However, the model generating unit 26 can generate various models.

For example, the model generating unit 26 can generate personal behavior estimation models and common behavior estimation models on the basis of behavior histories of drivers in case of determining unsafe states. Also, if drivers perform sudden operations such as a sudden brake operation, a sudden pedal operation, or a sudden accelerator operation, the model generating unit 26 can generate personal behavior estimation models and common behavior estimation models on the basis of behaviors of the drivers before the sudden operations.

In these cases, for example, in a case where the difference between the current behavior transition of a driver and the surrounding state of his vehicle and those of a personal behavior estimation model or a common behavior estimation model is equal to or less than a predetermined reference (the similarity is high), the state determining unit 28 determines that the driving state of the driver is an unsafe state. Therefore, it is possible to more appropriately determine whether the driving state of the driver is an unsafe state.

Also, in the above described embodiment, an example in which unsafe states are determined on the basis of big data on driving histories has been described. However, the control unit 19 of the in-vehicle device 10 can include a determining unit for determining distracted driving or drowsy driving on the basis of sight line movement and face movement.

In this case, the determining unit of the in-vehicle device 10 determines distracted driving or drowsy driving on the basis of the state of the driver detected by the driver state detecting unit 12, and notifies the corresponding information from a notifying unit such as the HUD 17. Therefore, it is possible to perform notification of the determining unit and notification of the driving assistance server 20 together, whereby it becomes easy for the driver to transition his driving state to a safe driving state.

However, if driving assistance (notification) is frequently performed, some drivers may be irritated or may not sense danger even in a very dangerous situation. For this reason, the control unit 19 of the in-vehicle device 10 is configured to be able to reduce the number of driving assistance (notification) places. For example, the control unit 19 of the in-vehicle device 10 can reduce the number of driving assistance places by comparing the state of the driver with the personal behavior estimation model or the common behavior estimation model and also can reduce the number of driving assistance places according to the levels of danger of the corresponding places (spots) (for example, according to dangerous location determination or the like based accident information or sight line information described above). For example, the control unit 19 of the in-vehicle device 10 cannot perform notification if the level of danger of a place (a spot) is equal to or lower than a rank C. Also, according to the level of danger of a place (a spot), the control unit 19 of the in-vehicle device 10 can change a determination reference based on the difference between the state of the driver and the personal behavior estimation model or the common behavior estimation model. Further, for example, as the level of danger increases, the control unit 19 can reduce an allowable difference.

Also, the control unit 19 of the in-vehicle device 10 updates the behavior estimation models with new data, and if some factors such as change in the roadway condition are considered, appropriateness of new data increases. For this reason, the control unit 19 of the in-vehicle device 10 can be configured to be able to subsequently delete old data or perform a weighting process (for example, imposing a larger weight to newer data) according to elapsed time during statistic processing, thereby more accurately generating behavior estimation models.

Also, it may be difficult to gather data for personal behavior estimation models (for example, data may be insufficient). For this reason, the control unit 19 of the in-vehicle device 10 is configured to be able to partially use common behavior estimation models. For example, the control unit 19 of the in-vehicle device 10 can compensate a shortage of personal behavior data (for example, a shortage in a predetermined amount of data for keeping reliability) with common behavior models. Due to this process, as a larger amount of personal behavior data is collected, a personal behavior estimation model including more personal behavior data is generated. Also, data may get obsolete as described above, and the control unit 19 of the in-vehicle device 10 can compensate a data shortage attributable to deletion of obsolete data (for example, old data) with common behavior models.

Also, sight line information can be used to estimate dangerous places as described above, and can also be used to determine dangerous driving. For example, the control unit 19 of the in-vehicle device 10 can make a database of models of sight line movements in danger occurrence states (such as accident occurrence states and sudden braking occurrence states) and models of sight line movements in safe driving states (for example, the control unit collect big data on the corresponding models such that statistic processing is possible), and compare an actual sight line movement state at a place with at least one sight line movement model (for example, at least one of a model in a danger occurrence state and a model in a safe state), and determine the level of danger on the basis of the difference between them. In this case, the control unit 19 of the in-vehicle device 10 can monitor movements of sight lines from a place (for example, in case of a curve, a place immediately before an appropriate place for staring preparation (such as checking of the surrounding area) for a deceleration operation) having an influence on the state in a dangerous place (for example, a place where accidents and the like are likely to actually occur), thereby capable of making gentle actions (such as advice on driving) without metal burden on drivers.

As described above, the driving assistance system and the driving assistance method according to the present invention are useful to drivers of vehicles, and are especially suitable for making drivers transition their driving states to safe driving states.

What is claimed is:

1. A driving assistance system for assisting a driver to drive a vehicle, comprising:
   a behavior detecting unit in the vehicle and configured to detect a current behavior of the driver;
   a processor;
   a memory storing a program which causes the processor to perform a process, the process comprising:
   storing a behavior history, which is a past behavior history of the driver, in a history storage unit;
   determining an unsafe state by comparing a transition of the current behavior detected by the behavior detecting unit with the behavior history of the driver corresponding to a current driving path, in a state determining unit; and
   storing attention-necessary place information representing an attention-necessary place where the driver should carefully drive the vehicle, in a place information storage unit; and
   a notifying unit disposed in the vehicle and configured to give a notification to the driver when the processor determines the unsafe state,
   wherein, on the basis of the attention-necessary place information, the processor determines a distance between a current place and the attention-necessary place, and
   wherein the processor causes the notifying unit to increase a notification level of the notification as the vehicle get close to the attention-necessary place.

2. The driving assistance system according to claim 1, wherein, on the basis of the attention-necessary place information, the processor determines a timing to give the notification to the driver.

3. The driving assistance system according to claim 2, the process further comprising:
   determining the attention-necessary place on the basis of behavior histories of a plurality of drivers,
   wherein the processor stores the attention-necessary place determined by an attention-necessary place determining unit.

4. The driving assistance system according to claim 1, wherein:
   the behavior of the driver includes at least one of a sight line of the driver and a driving operation of the driver.

5. A driving assistance method executed in a driving assistance system for assisting a driver to drive a vehicle, the drive assistance system comprising:
   a behavior detecting unit disposed in the vehicle;
   a notifying unit disposed in the vehicle;
   a processor; and
   a memory storing a program to be executed by the processor,
   the driving assistance method comprising:
   a history storing step of storing a behavior history, which is a past behavior history of the driver, in a history storage unit;
   a behavior detecting step of detecting a current behavior of the driver, by the behavior detecting unit;
   a behavior comparing step of comparing a transition of the current behavior detected by the behavior detecting step with the behavior history of the driver corresponding to a current driving path, using the processor;
   a state determining step of determining an unsafe state on the basis of a comparison result of the behavior comparing step, using the processor;
   a notifying step of giving a notification to the driver, by the notifying unit, when the unsafe state is determined by the state determining step; and
   a place information storing step of storing, in a place information storage unit, attention-necessary place information representing an attention-necessary place where the driver should carefully drive the vehicle, wherein, on the basis of the attention-necessary place information, the processor determines a distance between a current place and the attention-necessary place, and wherein the processor causes the notifying unit to increase a notification level of the notification as the vehicle get close to the attention-necessary place.

\* \* \* \* \*